Jan. 11, 1944. W. H. MURAD 2,338,867
MACHINE TOOL TURRET
Filed July 1, 1941
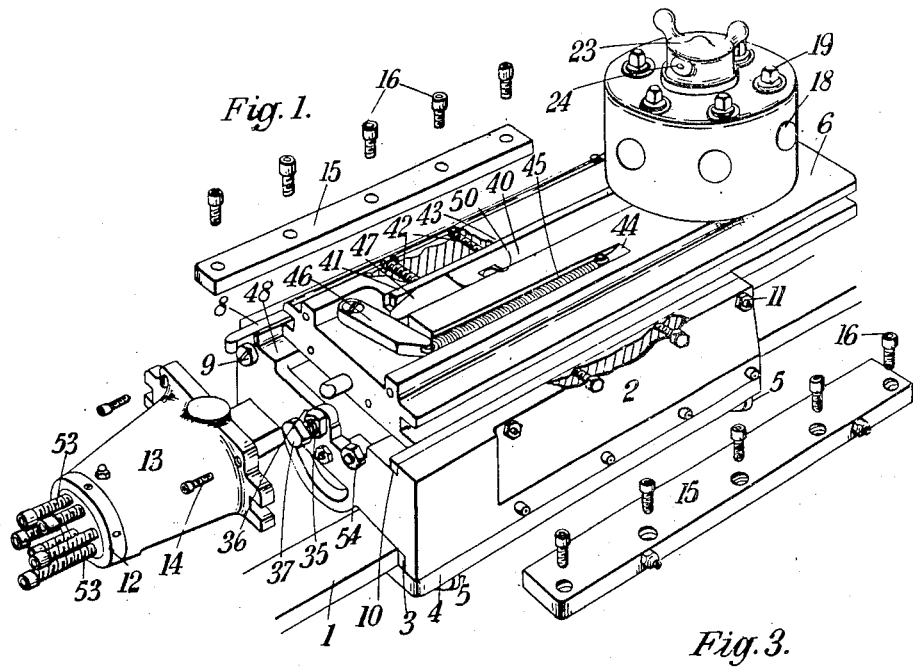
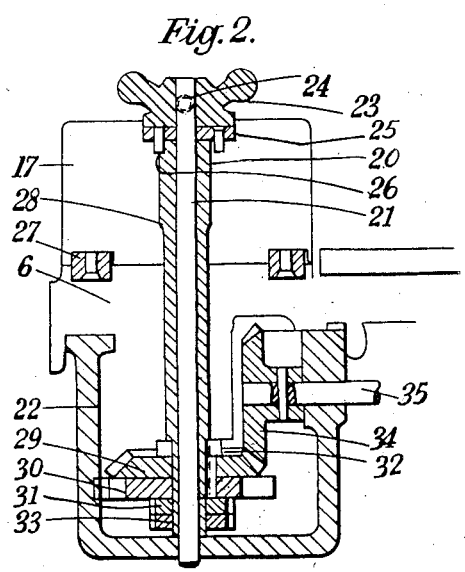
INVENTOR
Wadia Halim Murad
BY
Sager & Malcolm
ATTORNEYS Patented Jan. 11, 1944

2,338,867

UNITED STATES PATENT OFFICE 2,338,867

MACHINE TOOL TURRET

Wadia Halim Murad, Watford, England

Application July 1, 1941, Serial No. 400,595
In Great Britain February 21, 1940

1 Claim. (Cl. 29—48)

This invention relates to machine tool turrets and has for its object to provide improvements whereby indexing of the turret is facilitated and correct axial alignment between the tool positions on the turret and the spindle of the machine is maintained, irrespective of whether the turret is indexed by hand or mechanically.

A machine tool turret is usually mounted on a seating surface on its slide and adapted to be rotated about or with a turret post which is fixedly or rotatably mounted in the slide, according to whether the turret is arranged to be indexed by hand or mechanically. In both cases detent means are provided on the turret and slide, which are adapted to coact for the purpose of arresting the turret according to the tool positions. For hand indexing, the turret is arranged to be clamped to the slide in the respective working positions by means of a hand nut or the like threaded on the upper end of a bolt passing through the turret post and anchored in the slide. This nut or the like thus requires to be slackened off and tightened down again at each turret indexing operation, with consequent loss of time and labour on the part of the operative. Moreover, wear is bound to occur in time between the turret and its seating on the slide, with consequent loss of correct alignment between the tool positions and the spindle of the machine tool. This last mentioned drawback applies equally in the case of turrets arranged to be indexed mechanically, for instance in dependence on the reciprocating movement of the slide.

According to the invention, with a view to overcoming these drawbacks, the turret is adjustably clamped against its supporting structure with the interposition of one or more friction bearing elements, whereby the frictional resistance to rotation of the turret is finely adjustable to a value which ensures steadiness of the turret while allowing of manual indexing without slackening the clamping means.

For this purpose, for instance, the turret is provided with a bearing ring of suitable metal with which it bears against a seating on its slide, the bearing pressure being adjustable by means of a clamping nut threaded and lockable on the upper end of a central bolt passing through the turret post. The locking means conveniently consist of a pad accommodated in a recess in a transverse bore of the nut and pressed into gripping contact with the screw thread on the bolt by a grub screw threaded in a radial hole in the boss of the nut. A further friction bearing element is preferably provided between the top of the turret and the clamping nut.

According to a further feature of the invention the friction bearing elements are detachably secured to the turret or its supporting structure so as to be replaceable when worn.

In use, the clamping nut, which is conveniently in the form of a hand nut, is tightened until the frictional resistance to turning of the turret is sufficient to ensure steadiness of the turret without impeding the indexing motion, after which the locking means are tightened up to retain the adjustment. The adjustment thus effected may then be left until the turret requires dismantling or until re-adjustment becomes necessary owing to wear.

A further feature of the invention consists in providing a seating shoulder in the turret bore and on the turret post in a plane intermediately between the top and bottom surfaces of the turret and preferably substantially on a level with the tool positions, for the purpose of obtaining improved load distribution. In the case of a hand indexed turret rotating about a fixed turret post, a friction bearing element may with advantage be provided at this shoulder.

In connection with mechanically indexed turrets it is usual to locate the operative positions of the turret by means of a notched ring secured to the turret and adapted to be engaged by a spring-urged locking bolt which is retracted against the action of its spring and released by a tripping element, in dependence on the return movement of the turret slide, so that at each return movement of the slide, the turret is first liberated and then indexed to the next position where it is arrested by the engagement of the bolt in the next notch of the ring. For this purpose the turret locking bolt has hitherto been housed in a guide socket in the turret slide and urged by a compression spring bearing directly against the rear end of the bolt and housed in the outer portion of the said guide socket. This arrangement of the locking mechanism has several drawbacks. In the first place, owing to the lateral stresses imposed, in conjunction with the relatively short length of the turret locking bolt resulting inevitably from the end to end arrangement of the bolt and its spring, this bolt is apt to develop lateral play in its guide socket, with the result that the turret is not accurately arrested or firmly held in the arrested position. Secondly, there is no possibility of eliminating such play except by re-machining the socket and fitting an oversize locking bolt. Thirdly, the compression spring, being constantly under strong compression, is liable to premature fatigue and failure.

According to the present invention, these drawbacks are obviated by providing a turret locking bolt which is adjustably pressed against one wall of a guide channel in the turret slide and urged towards the turret by a spring acting upon the rear end of the bolt through the intermediary of a rocking lever.

In this way it becomes possible to utilise the greater part of the length of the turret slide for the accommodation and guidance of the turret locking bolt, which may be proportionately extended in length as compared with known arrangements, while at the same time the initial tension of the loading spring (i. e., the tension when the locking bolt is engaged) need be but slight, and, thirdly, any lateral play developing between the bolt and its guide may be accurately taken up.

An embodiment of the invention is shown, by way of example, in the accompanying drawing, in which:

Figure 1 is a perspective view of a turret assembly with the turret slide cover removed and certain parts shown at a distance from their normal positions to disclose the essential parts.

Figure 2 is a longitudinal axial section of the turret and its mounting.

Figure 3 is a partial longitudinal section of the rear stop drum.

Referring to the drawing, 1 denotes a machine tool bed on which a turret saddle 2 of generally conventional design is slidable and lockable with the aid of a gib 3, clamping cheeks 4 and set screws 5. A turret slide 6 is adapted to travel in a seating recess 7 in the top of the saddle 2, and is aligned and laterally guided on one side by a taper gib 8 adjusted by a screw 9 threaded in the end of the saddle 2 and having a head engaging a recess in the under side of the taper gib, and on the other side by a parallel gib 10 which is adjustable by means of screws 11 equipped with lock nuts. A stop drum 12 is rotatably supported in a flanged housing 13 attached by screws 14 to the rear end of the turret slide 6. The side edges of the turret slide and the stop drum housing flange are recessed flush with the upper surface of the saddle 2 and gibs 8 and 10 for engagement by key plates 15, 15 bolted to the top of the saddle by screws 16.

The tool turret, Figure 2, is mounted on the forward part of the slide 6 and comprises a cylindrical body 17 having six tool holding sockets 18 and clamping screws 19. The turret body 17 is fast to a tubular turret post 20 which in its turn is rotatable on a bolt 21 anchored at the lower end in a stirrup bracket 22 attached to the underside of the turret slide 6. On the upper end of the bolt 21 there is threaded a clamping hand nut 23 adapted to adjust the pressure with which the turret body 17 bears against its seating on the slide 6 and locked in its position of adjustment by means of a locking grub screw 24.

Between the clamping nut 23 and the top of the turret body 17 is interposed a bearing ring 25 which is countersunk flush with the top of the turret and held in position by grub screws 26 which also serve to key the turret body to the turret post 20. Between the under side of the turret and its seating on the slide 6 is likewise interposed a bearing ring 27, secured in the present instance to the turret and fitting with working clearance in an annular recess in the seating. The turret post 20 is shouldered, as at 28, within the turret body, to give improved load distribution, as already described.

Keyed on the lower part of the turret post 20 are a bevel gear wheel 29 and star wheel 30 which are clamped between a lock nut 31 and a spring washer 32 counter-supported against a shoulder on the turret post. A lock nut 33 completes the elements assembled on the turret post. The star wheel 30 coacts with conventional indexing mechanism (not shown) while the bevel wheel 29 meshes with a bevel wheel 34 secured to a shaft 35 which extends beneath the slide 6 and through a bearing 36 at the rear end of the saddle 2 (Figure 1) and carries at its outer end a coupling member 37 from which the drive for the rear stop drum 12 is taken.

Attached to the under side of the turret body 17 is a notched ring (not shown) adapted to be engaged in the manner specified above by a locking bolt 40. The locking bolt is of flat rectangular section and housed in a channel 41 in the top of the body of the turret slide 6, which is wider than the bolt and against one side of which the bolt is adjustably pressed by set screws 42 bearing against a gib 43 inserted between the bolt and the wall of the guide channel 41. For convenience of operation, the set screws 42 extend to the outside of the turret slide and are provided with sockets for engagement by a turning implement. Parallel with the locking bolt guide channel is a further channel 44 in the top of the turret slide, for the accommodation of a tension spring 45 attached by one end of the slide 6 and by the other end to a rocking lever 46 pivoted on the slide and bearing against the rear end of a tapered thrust piece 47 abutting against the locking bolt 40, this lever and its pivot being likewise accommodated in a suitable recess 48 in the top of the slide. The locking bolt 40, spring 45, and lever 46 are flush with the main top surface of the body of the slide 6, and are finally enclosed by a cover plate (not shown) screwed to the top of the slide. The locking bolt 40 is actuated by a tripping pawl 50 associated with the indexing mechanism proper comprising for instance a thrust rod operated by the slide control member and coacting with the star wheel 30 (Figure 2) keyed to the turret post.

By arranging the locking bolt in the described manner in the top of the body of the turret slide, it also becomes possible to attach the notched ring directly to the turret instead of to the turret post, with consequent gain both in accuracy and strength. Moreover, by arranging the star wheel 30 of the indexing mechanism at the lower end of the turret post it becomes possible to provide a longer bearing for the turret post than hitherto, while at the same time ample room is afforded for the accommodation, beneath the slide, of the gearing for transmitting rotation of the turret to the stop drum 12.

The stop drum 12 (Figure 3) which is rotatable in the rear end of housing 13, is fast on a central shaft 52 which is likewise supported in the housing 13 and the forward end of which is equipped for engaging the coupling element 37 on the shaft 35. Threaded longitudinally in the drum 12 are six stop bolts 53 corresponding severally with the six tool positions 18 in the turret and adapted to bear in turn against a stop screw 54 threaded in the rear end of the saddle 2. The outer ends of the stops 53 are socketed for engagement by a turning implement in effecting adjustment of the stops to determine the forward limit of travel of the turret slide for each individual tool set up in the turret.

It will be understood that, with the described arrangement the turret may be indexed by hand, without slackening the nut 23 if properly adjusted, provided the slide is first retracted sufficiently to bring the locking bolt 40 out of engagement with the notched ring on the turret.

In other respects, the turret and its supporting structure may be of conventional design. The constructional details of the elements involved in the realisation of the described features peculiar to the present invention may also be modified without departing from the scope of the invention.

What I claim and desire to secure by Letters Patent is:

A machine tool turret assembly comprising a support, a turret slide mounted thereon, a bearing bolt, means securing said bearing bolt to said slide, a tubular turret post axially slidable and rotatably mounted on said bolt and extending below said slide, a cylindrical turret body having tool holding sockets keyed to said post and extending downwardly for seating on said slide, a frictional bearing ring interposed between the bottom of said turret body and said slide, a clamping nut threaded and lockable on said bearing bolt and cooperating with said turret body for adjusting the pressure of said turret body upon said bearing ring, a second frictional bearing ring interposed between said clamping nut and the top of said turret body, a gear keyed to said tubular turret post below said slide, a stop mechanism on said support, and transmission means connecting said gear and said stop mechanism.

WADIA HALIM MURAD.